United States Patent Office 3,520,510
Patented July 14, 1970

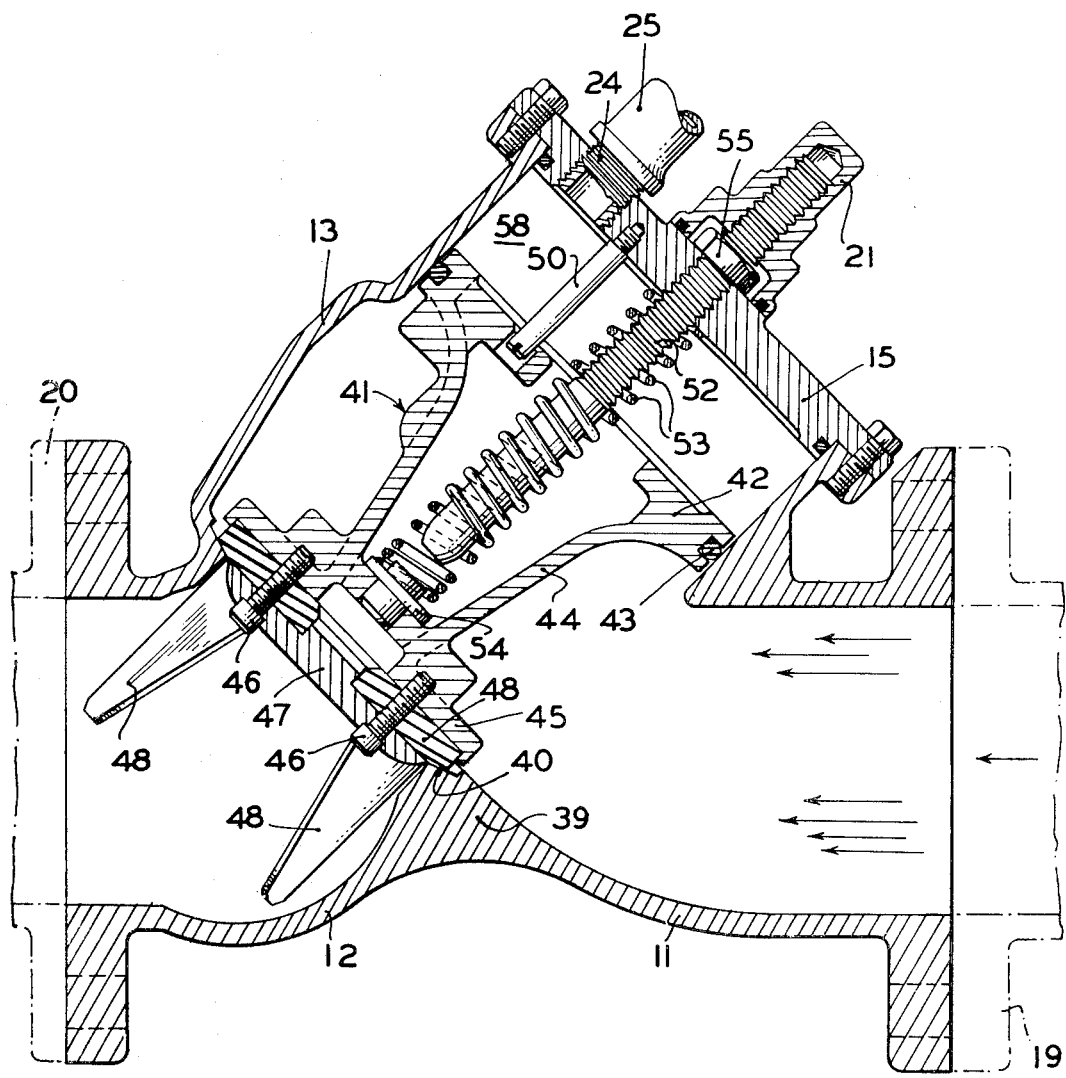

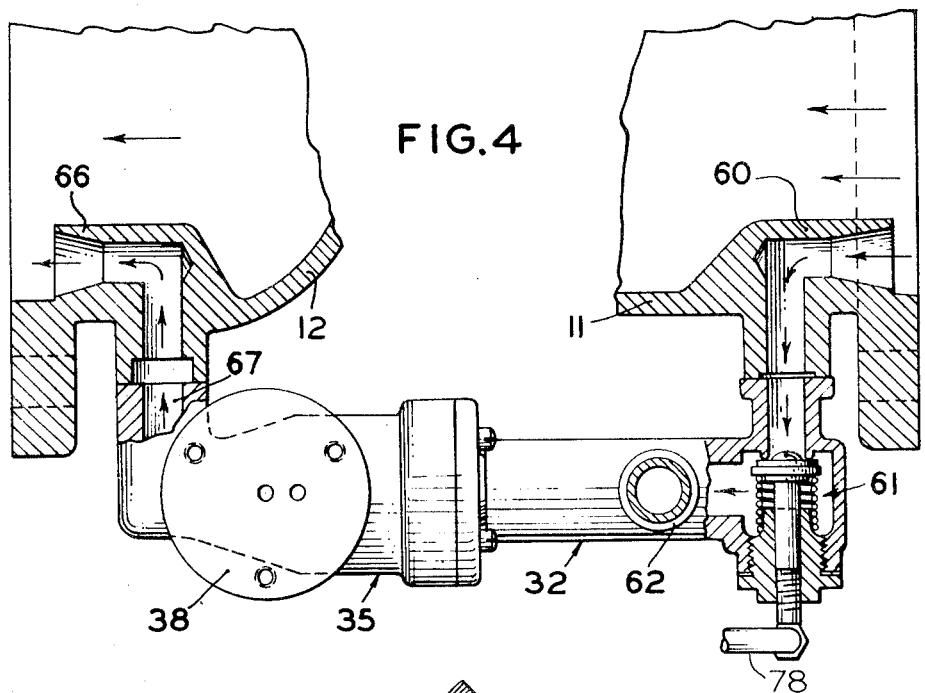
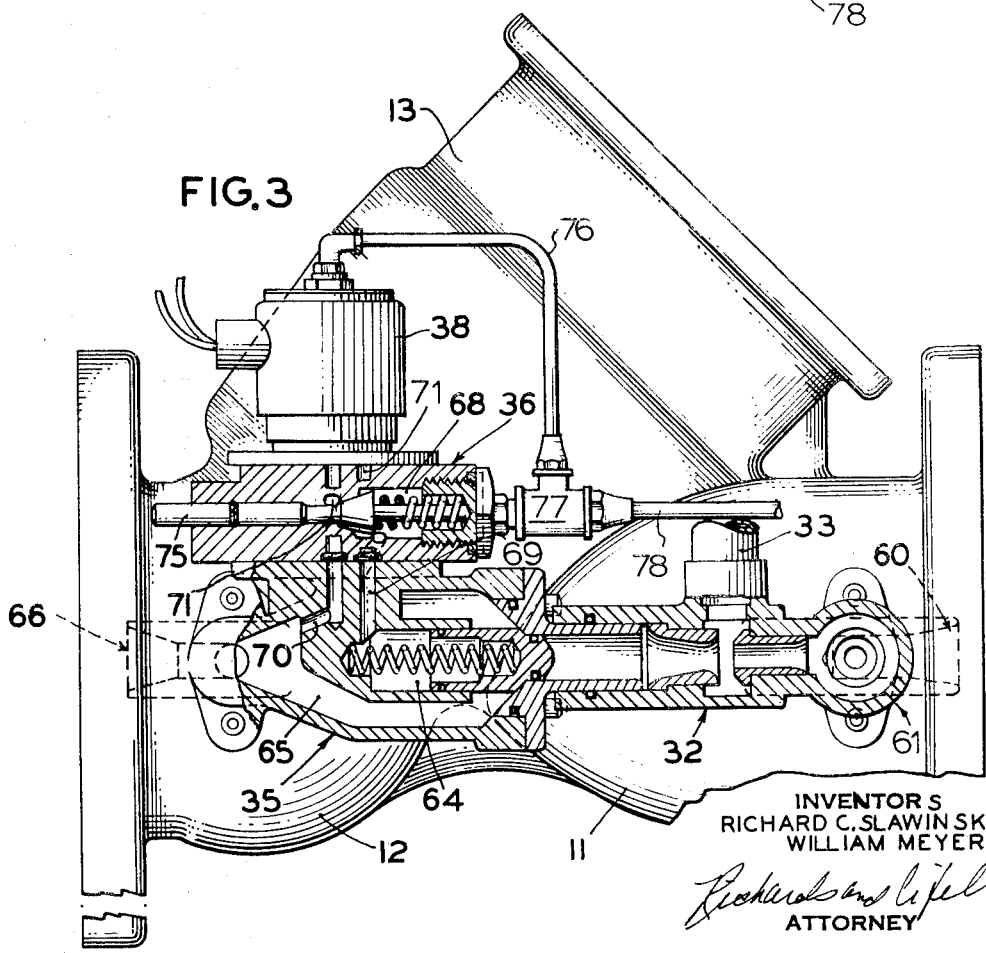

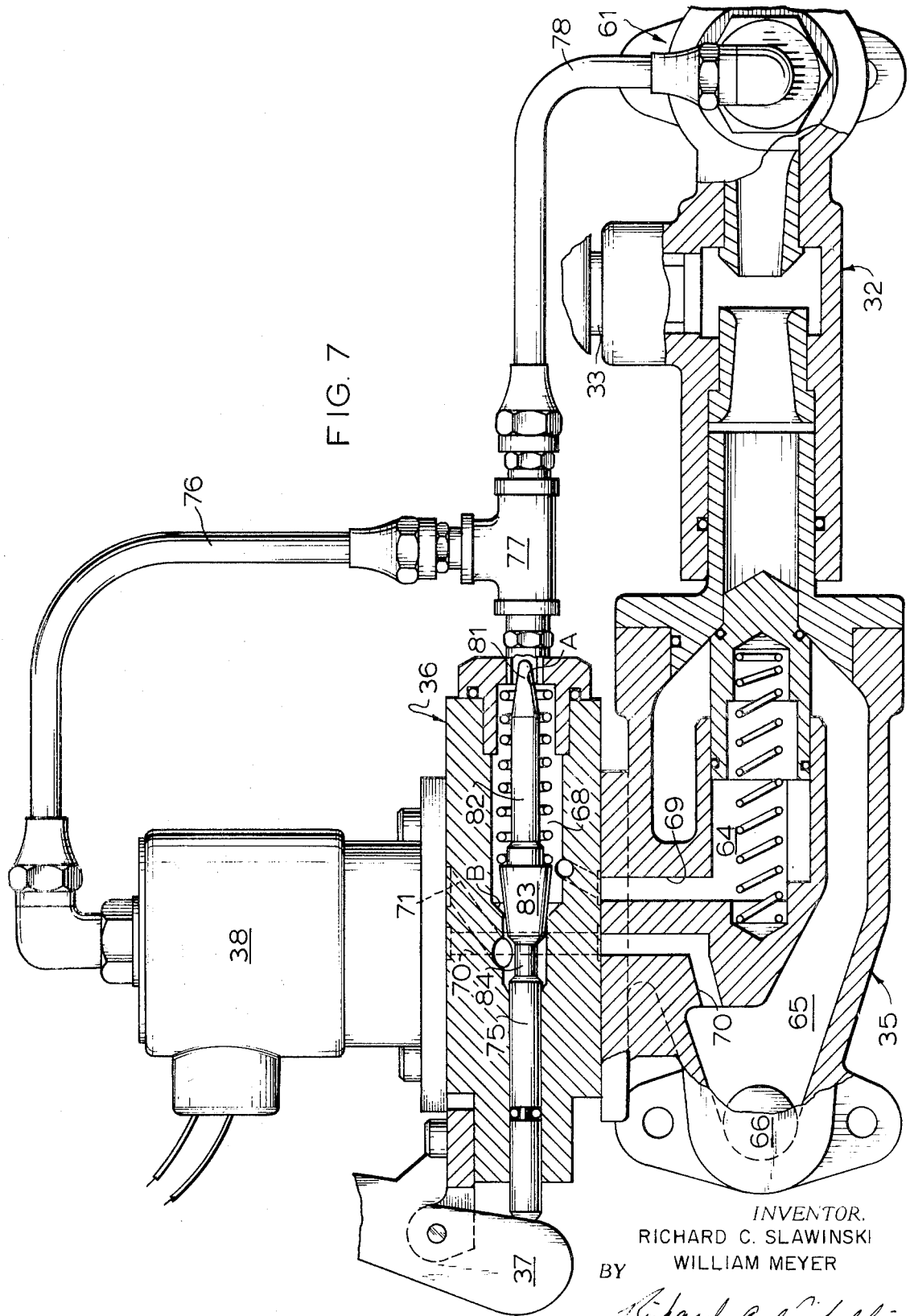

3,520,510
FLOW CONTROL VALVE
Richard C. Slawinski, Murray Hill, and William Meyer, East Orange, N.J., assignors to Emco Wheaton, Inc., Union, N.J., a corporation of New Jersey
Continuation-in-part of application Ser. No. 536,551, Mar. 7, 1966, which is a continuation-in-part of application Ser. No. 511,091, Dec. 2, 1965. This application May 8, 1969, Ser. No. 837,981
Int. Cl. F16k 31/143
U.S. Cl. 251—24                    8 Claims

ABSTRACT OF THE DISCLOSURE

A fast acting venturi assisted valve wherein the line pressure is utilized to effect both the opening and closing of the valve including a fluid operated pilot valve for the main valve, controlled by a manual operated pilot valve.

---

This application is a continuation-in-part of copending U.S. patent application Ser. No. 536,551 filed Mar. 7, 1966, and now abandoned which is a continuation-in-part of Ser. No. 511,091, filed Dec. 2, 1965, and now abandoned.

This invention relates to control valves and more particularly to a novel construction and arrangement of a flow control valve having improved operating characteristics.

Flow control valves, of the class to which this invention relates, are installed near the end of a line extending from a storage container and a transport vehicle, thereby to afford convenient operation by the operator. Generally, such valves include a main plunger, or piston, of conical configuration and arranged for reciprocating movement relative to a valve seat. Heretofore, the construction and arrangement of these valves has been such that a back pressure has existed opposing the opening and closing of the valve by the line pressure. In consequence, there is a substantial pressure drop through the valve, thereby necessitating the use of pumping apparatus to increase horsepower rating.

A flow control valve made in accordance with this invention comprises a main valve and associated auxiliary valves arranged and constructed so that the line pressure is utilized to effect the closing and opening of the main valve. In the valve-closing cycle, the line pressure is applied to the larger-diameter portion of the main valve plunger. This results in a positive closing of the valve. During the valve-closing cycle, means are provided to effect a rapid movement of the plunger during the major portion of the cycle and thereafter to slow down the plunger movement so that it seats in the closed position with a minimum of hammer thump. During the valve-opening cycle, the line pressure is removed from the larger-diameter portion of the plunger and applied to the other side of the plunger to effect movement of the plunger away from the valve seat. The operation of the valve to the open and closed positions may be controlled manually by means of a lever actuatable pilot valve or by means of a three-way solenoid-actuated valve, both such valves being secured in fixed position on the main valve. These two valves are so arranged that operation of the manually controlled pilot valve can only open the main valve if the solenoid valve has been previously actuated. Means also are provided to prevent the plunger of the main valve from popping open when the pump is started by preventing product flow back to the storage container.

An object of this invention is the provision of a fast-acting flow controlled valve wherein the line pressure is utilized to effect both the opening and closing of the valve.

An object of this invention is the provision of a pilot-operated flow control valve constructed and arranged so that the line pressure is applied to one side of the main valve plunger during the valve-closing cycle, which line pressure automatically is removed from said one side of the plunger and applied to the other side thereof during the valve-opening cycle.

An object of this invention is the provision of a pilot-operated flow control valve comprising a generally conical-shaped main plunger movable to open and closed position relative to a valve seat in response to opening and closing of a pilot valve, means effective upon opening of the pilot valve to apply the upstream line pressure to one side of the plunger to thereby drive the plunger forward toward the valve seat, means automatically slowing down the forward movement of the plunger as it approaches the valve seat, means effective upon closing of the pilot valve to transfer the line pressure to the other side of the plunger to thereby drive the plunger in a reverse direction, and adjustable means to limit the movement of the plunger in the reverse direction.

These and other objects and advantages will become apparent from the following description when taken with the accompanying drawings. It will be understood, however, that the drawings are for purposes of illustration and are not to be construed as defining the scope or spirit of the invention, reference being had for the latter purpose to the claims appended hereto.

In the drawings wherein like reference characters denote like parts in the several views:

FIG. 2 is a cross-sectional view taken along a vertical plane passing through the center of the main valve;

FIG. 3 is a cross-sectional view taken along a vertical plane passing through the pilot valve assembly;

FIG. 4 is related, fragmentary, top plan view, with portions in cross-section, to show the upstream and downstream parts formed in the valve body and communicating with the pilot valve assembly;

FIG. 7 is a cross sectional view taken along a vertical plane passing through the pilot valve assembly as in FIG. 3, but drawn on a larger scale.

Figure 1:
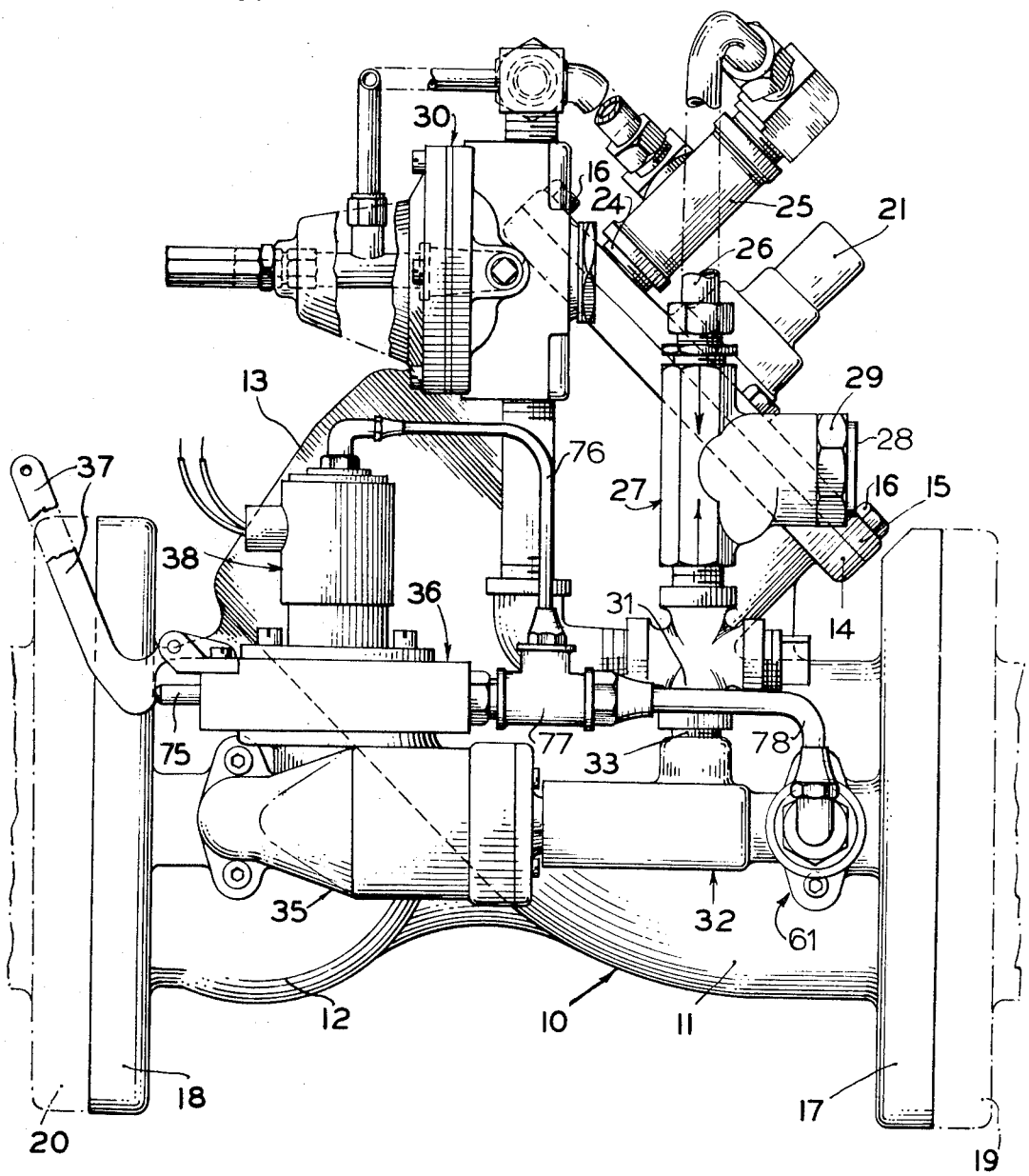
FIG. 1 is a side elevational view showing a flow control valve made in accordance with this invention, together with the associated auxiliary valves and external piping.

Referring now to FIG. 1, the main valve 10 has a body comprising axially-aligned portions 11 and 12 and an angularly offset portion 13. The offset portion terminates in a flange 14 of which a closure plate 15 is secured by a plurality of bolts 16, and the body portions 11 and 12 terminate in aligned flanges 17 and 18 by means of which the valve is connected to corresponding flanges provided on the upstream line 19 and the downstream line 20. As will be described in detail hereinbelow, the closure plate 15 is provided with a central, threaded hole receiving an adjusting screw, the exposed end of such screw being covered by a suitable cap 21.

Threaded into another hole formed in the closure plate 15 is a pipe nipple 24 carrying a T-type pipe coupling 25, the other end of such coupling being connected, by a pipe 26, to the upper end of an auxiliary flow control valve 27. The latter valve is adjustable by means of an adjusting screw 28 and a lock-nut 29. Suitable piping also connects the coupling 25 to a conventional pressure regulator 30. The return lines from the flow control valve 27 and the pressure regulator 30 are connected to a venturi 32 by a pipe 33. Although not visible in FIGS. 1 and 2, it is here pointed out that the right side of the venturi is in communication with a flared inlet port 60, shown in FIGS. 3, 4, 5 and 6, disposed within the valve body portion 11 and directed upstream. The other end of the venturi is connected to a pilot valve 36, through a shuttle valve 35, said pilot valve being adapted for communication with a flared outlet port 66 disposed within the valve body portion 12 and directed downstream. The pilot valve 36 is operated, manually, by means of pivotally-mounted lever 37. A solenoid-operated, three way valve 38 is arranged so as to permit opening of the main valve by manual actuation of the pilot valve only when the solenoid valve is open. The operation of the pilot valve and the solenoid-operated valve will be described in detail hereinbelow. At present, it is pointed out that when either or both of these valves are in normal closed conditions, the flow of the liquid through the main valve and the auxiliary valves effects a closing of the main valve. Upon operation of both of these valves to the open operating position, the fluid flow effects the opening of the main valve. The construction of the main valve will now be described, with specific reference to the cross-sectional view of FIG. 2. Formed in the valve body is a valve seat partition 39 having a ground annular portion forming a valve seat 40 of conical configuration. The main plunger 41 has a relatively large diameter base portion 42 carrying an O-ring gasket 43 and is slidable within the uniform diameter, upper end of the offset body portion 13. The plunger base portion 42 terminates in a conical mid-portion 44 having a solid wall, which mid-portion terminates in an outwardly-directed flange 45. Secured to the flange 45, by the screws 46, is a locating plate 47 having integral guide fins 48 extending therefrom. These guide fins are adapted for sliding movement within the circular opening of the valve seat partition 39 and serve to maintain movement of the plunger along the axis of the valve seat. Rotation of the plunger, during reciprocating movement thereof, is prevented by a pin 50 having one end threaded into a hole provided in the closure plate 15 and the other end extending through a clearance hole formed in plunger base portion 42.

The plunger base portion 42 has a central hole formed therein for clearing the adjusting screw 52 and the compression spring 53. The lower end of the spring is positioned over a flanged rod 54, which is forced-fitted into a central hole provided in the wall closing the apex of the plunger, and the upper end of the spring abuts the cover plate 15. In FIG. 2, the valve is shown in the closed position. It will be apparent that the maximum upward displacement of the plunger is determined by the spacing between the rod 54 and the end of the adjusting screw 52. Such spacing may be set to a predetermined value by threading the screw through the threaded hole of the closure plate 15, after which the screw is locked in such position by means of the nut 55. The exposed portion of the adjusting screw is covered by the internally-threaded cap 21. Also shown in FIG. 2 is the pipe nipple 24 carrying the T-type pipe coupling 25 forming a passageway between the valve chamber 58 and certain auxiliary components, namely, the pressure regulator 30 and the auxiliary flow control valve 27 shown in FIG. 1. It is here pointed out that the valve chamber 58 comprises, essentially, the space inside the hollow conical portion 44 of the plunger, and the space between the plunger base portion 42 and the cover plate 15.

Reference now is made to FIGS. 3, 4 and 7 showing the construction and arrangement of the venturi 32, the shuttle valve 35 and the pilot valve 36. The right side of the venturi is connected to an integral, flared tube, or inlet port 60, which port is disposed within the valve body portion 11 and directed upstream. Inserted in this line is a spring-biased, normally-closed check valve 61.

A line 78 connects the exit port of check valve 61 with the entrance opening of pilot valve 36, thus applying full line pressure thereto. The central portion of the venturi is connected to the two lines coming from the auxiliary flow control valve 27 and the pressure regulator 30 (see also FIG. 1), by the line and coupling 33. The left side of the venturi is connected to the shuttle valve 35 having an inner chamber 64 and an outer chamber 65, the latter chamber being open, at all times to the flared outlet port 66 formed in the valve body portion 12 and directed downstream. The inner chamber 64 communicates with the right chamber 68, of the pilot valve 36, through the port 69 which also communicates with the solenoid-operated valve 38 through port B and passage 71 when port B is open. A port 70, which is best seen in FIG. 7 extends from the outer chamber 65 of the shuttle valve through the solid body of the pilot valve 36, behind the bore or chamber 68 of the pilot valve as best seen in FIG. 7, to the solenoid-operated valve 38.

The solenoid-operated valve 38 is a conventional 3-way valve, which has an inlet port communicating with a line 76 connected to a T-type pipe coupling 77, one end of which is in communication with the inlet port A of the pilot valve 36 and the other end of which is connected to line 78 in direct communication with the main line pressure on the inlet side of the main valve through the check valve 61 and flared port 60. With the solenoid-operated valve 38 in the energized or open condition and the pilot valve 36 in the open position (upon depression of the rod 75 by the lever 37 to open port B and close port A by means of the full diameter portion 82 of rod 75 seating in the port A), the inner chamber 64 of the shuttle valve 35 is open to the flared outlet port 66, thereby initiating action to open the main valve as will be described hereinbelow.

As noted previously the solenoid-operated valve is a conventional 3-way valve having a normally open inlet port (not shown) corresponding to port A of the pilot valve 36 and connected to direct line pressure through line 76, fitting 77, line 78, check valve 61 and inlet 60, just as is port A. The conventional solenoid valve also contains a normally closed port (not shown) corresponding to port B of the pilot valve 36; the normally closed port being connected to and closing port 70 which communicates with outer chamber 65 of the shuttle valve, which as noted above is always open to the downstream side of the main valve through port 66. The normally open and normally closed ports of the conventional solenoid-operated valve 38 are in communication with a chamber which in turn communicates with the lateral passage and port 71 opening into the chamber 68 to the left side of port B in the pilot valve 36.

FIGS. 3 and 7 show the manual pilot valve in normally closed condition, i.e. with port B closed by the bell-shaped portion 83 of rod 75, but with port A open to the full line pressure through 77, 78, 61 and 60. Line pressure entering chamber 68 through port A, of course, communicates with chamber 64 of the shuttle valve through port 69 thus forcing the shuttle to its normally closed position. The solenoid-operated valve is also normally closed as shown in FIGS. 3 and 7, the full line pressure entering the chamber of this valve through its normally open port and line 76. The normally closed port of the soleeoid valve closes off port 70 preventing release of the line pressure downstream, but the line pressure in the chamber of the solenoid-operated valve flows into the left side of chamber 68 in the pilot valve through the lateral port 71 to fill the space around reduced diameter portion 84 of the rod 75.

Now if the manual pilot valve is opened by actuating lever 37 to depress rod 75 and open the port B the portion 81 of the rod 75 advances simultaneously into port A until the full diameter portion 82 of the rod 75 seats in and closes port A. Opening of port B in this way permits line pressure through inlet 60, check valve 61, lines 78, 77 and 76 the normally open inlet port and internal chamber of solenoid valve 38, lateral passage 71 and the left side of chamber 68, to flow through port B into the right side of chamber 68 and thence through port 69 into the chamber 64 of the shuttle valve 65, still forcing the shuttle closed and preventing the opening of the main valve. Therefore, it is seen that when the solenoid-operated valve is in normally closed condition (closed to the downstream side of the main valve through port 70), opening the pilot valve 36 has no effect on the main valve which remains closed.

Now, however, if the solenoid-operated valve is energized, while port B of the pilot valve 36 is open, the normally open inlet of the solenoid valve is closed shutting off the line pressure from line 76 and simultaneously opening the normally closed port connected to line 70. In this way the pressure in chamber 64 of the shuttle valve holding the shuttle closed, is released through port 69, chamber 68 and port B of the pilot valve, lateral port 71 and the chamber of the solenoid valve to port 70, chamber 65 and outlet port 66 downstream. The line pressure passing through the venturi 32 now forces the shuttle valve 35 open and permits flow through chamber 65 and outlet 66 downstream depressing the chamber 58 in the main valve through line 33 and permitting the plunger of the main valve to be forced open by the line pressure in portion 11 of the main valve. It is seen, therefore, that when both the pilot valve 36 (port B) and the solenoid-operated valve 38 (normally closing port 70) are open, the main valve is forced open.

Permitting the pilot valve 36 to return to normal condition with port B closed opens port A permitting line pressure to enter chamber 68, flow through port 69 to chamber 64 and force the shuttle of the shuttle valve 35 to closed position thus again permitting pressure to build up in the venturi 32, line 33 and chamber 58 to force the main plunger closed.

Similarly, de-energizing the solenoid-operated valve 38 closes off port 70 to the downstream side of the main valve and permits line pressure to enter the solenoid valve chamber through line 76 to pass through lateral passage 71 to the chamber 68 (assume port B of the pilot valve is still open) and thence through port 69 to chamber 64 to force the shuttle valve closed and close the main valve as before. It is seen, therefore, that closing either the pilot valve (port B) or the solenoid-operated valve (port 70) while the other of the two, i.e. either the pilot valve or solenoid valve is open, acts to close the shuttle valve and main valve. It has already been seen above, that when both the pilot valve 36 (port B) and solenoid-operated valve (port 70) are closed, the main valve is also closed.

Figure 5:
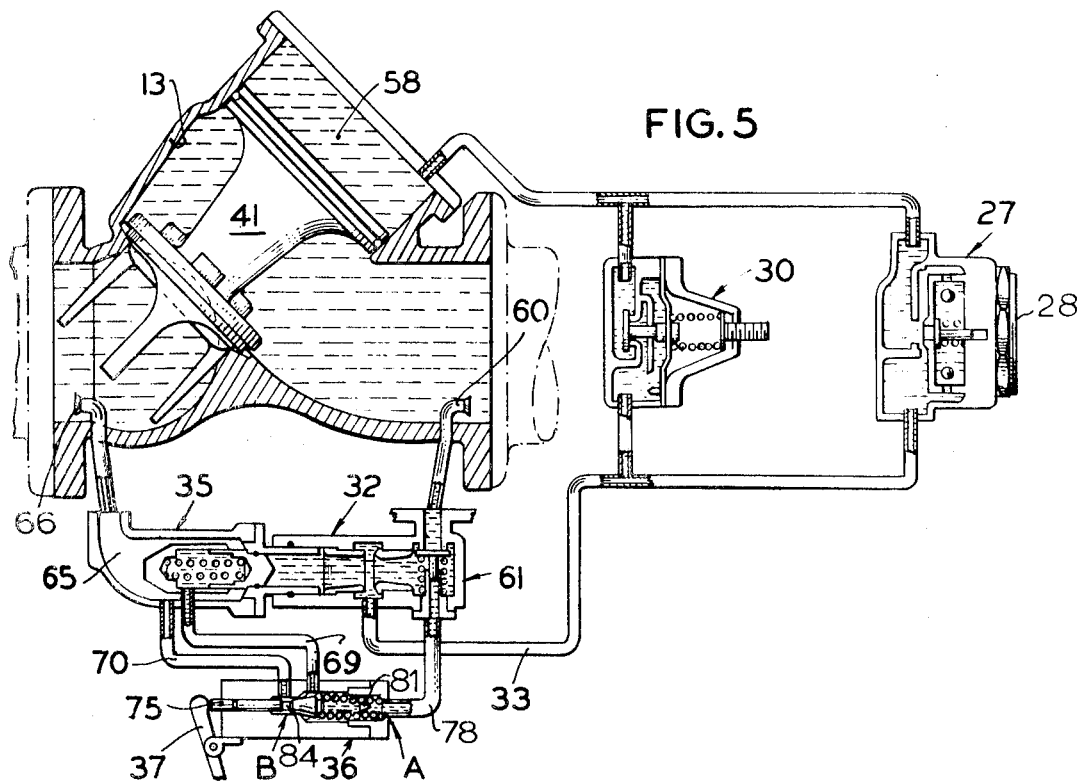
FIG. 5 is a diagrammatic representation of the complete valve and showing the main valve plunger in the closed position.
Figure 6:
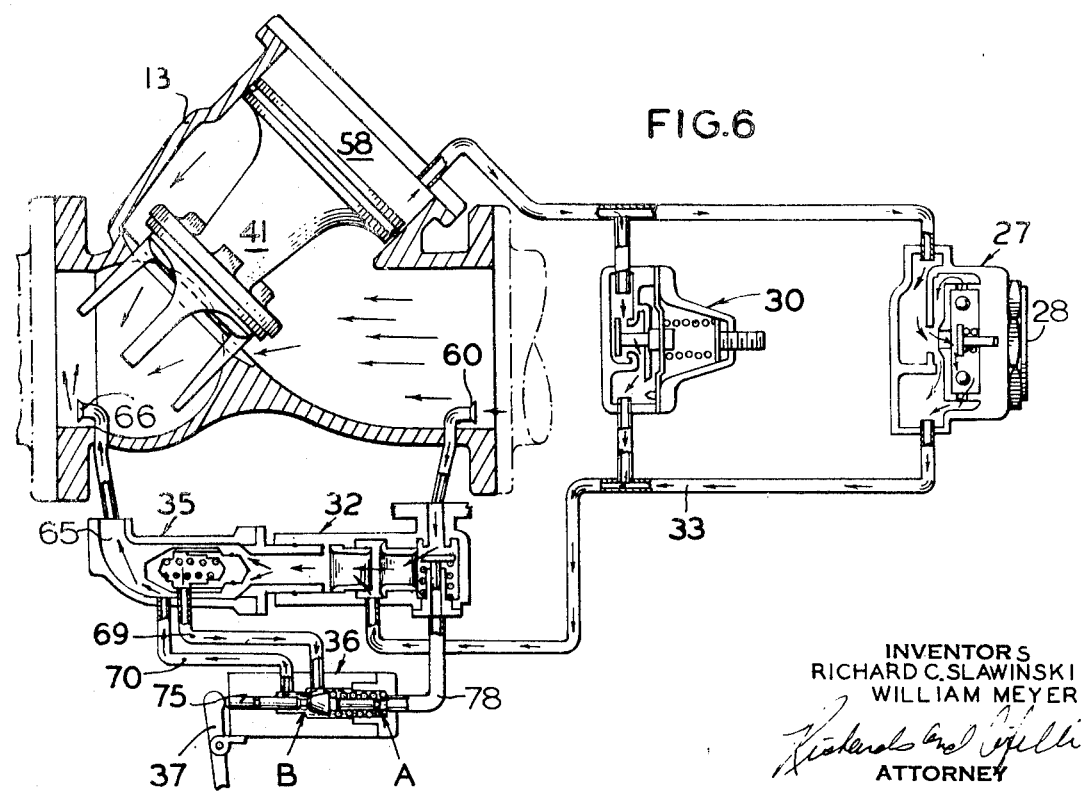
FIG. 6 is a similar diagram but showing the main valve plunger in the open position.

Reference now is made to the diagrammatic representations of FIGS. 5 and 6 representing an embodiment of the invention omitting the solenoid valve. In FIG. 5, the main plunger 41 is shown in the closed position. Under this static condition, the fluid pressure is equalized in the external piping and, although the inner chamber 64 of the shuttle valve 35, is closed, both sides of the plunger are sealed at the seat of the shuttle valve. To initiate action to open the main valve, the lever 37 is rotated to depress the rod 75 of the pilot valve, as shown in FIG. 6. The pilot valve plunger or tapered portion 81 and full diameter portion 82 now closes the pressure entrance opening or port A and opens the port B (FIG. 6) by moving bell-shaped portion 83 of the rod 75 out of the seat in port B. This opening of the port B provides communication between the ports 69 and 70 thereby releasing the pressure in chamber 64 acting upon the piston of the shuttle valve 35. The shuttle valve now pops open, thereby releasing the pressure holding the main plunger against the valve seat. The arrows in the piping show the flow pattern at this stage. When the shuttle valve 35 opens, a large volume of the line product flows through the flared inlet port 60, past the check valve 61, and through the venturi 32 on its way to the shuttle valve. Such fluid, together with the fluid flowing in the line 33, passes through the outer chamber 65, of the shuttle valve, and enters the downstream flow through the flared exit port 66, which port faces downstream to prevent back pressure from the main valve flow.

As the fluid flows through the venturi, a partial vacuum is formed in the piping leading from the upper side of the plunger 41, thereby assisting the line pressure to force the plunger off its seat. As long as the pilot valve is held in the open position, that is, the position shown in FIG. 6, the main plunger continues to move away from its seat until it reaches the full open position. The pressure regulator 30 and the auxiliary flow control valve 27 are inserted in the piping leading from the main valve chamber 58 to the central portion of the venturi. The valve 27 is adjusted to allow full fluid flow when the plunger 41 is moving to the valve-open position and a restricted fluid flow when the plunger is moving to the valve-closed position. Also, the pressure regulator allows full flow into the main valve chamber 58 at the start of the closing cycle and shuts off the flow when the line pressure reaches approximately 80% of full pressure. Then the remaining flow into such chamber must pass through the valve 27, which valve is adjusted to allow a relatively slow flow in this direction. Consequently, the plunger seats softly with a minimum possibility of hammer thump. The check valve 61, in the manifold of the venturi, is to prevent the main valve plunger from popping open when the pump is started after having been shut off. This is accomplished by the check valve's function of locking the pressure in the system consisting of line 33, pressure regulator 30 and auxiliary flow control valve 27 and main valve chamber 58. This maintains the seal between plunger 41 and valve seat 40, thus preventing passage of air into the main line, which would permit product drain back.

It will now be apparent that release of the operating lever 37, associated with the pilot valve 36, results in a return of this valve to its normal position as shown in FIG. 5, thereby closing the port B and opening the pressure entrance port A. Fluid under line pressure now flows into the chamber 64 of the shuttle valve 35 through 60, 61, 78, port A and port 69 whereby the shuttle valve piston cuts off the flow from the venturi. The resulting line pressure opens the check valve 61 allowing fluid to flow out of the venturi and through the line 33. In this direction of fluid flow, the regulator 30 allows full flow into the main valve chamber to move the plunger rapidly toward its seat. When the pressure in such chamber equals about 80% of the full line pressure, the regulator closes and a slow flow continues through the auxiliary check valve 27 until the plunger is fully seated.

In FIGS. 5 and 6, there is shown only the manually-operable pilot valve for initiating action to open and close the main valve. Assuming the pilot valve is open such initiating action can also be effected by the solenoid valve as explained above. In such arrangement, the operator can open or close the main valve with a push button instead of pulling upon a lever, or lanyard.

In view of above description, it will be apparent to those skilled in the art, that the valve of the present invention, not only eliminates the back pressure characteristically opposing opening of the valves of the prior art, but actually provides a vacuum which assists the line pressure in opening the valve. This is a major advantage provided by the valve of the present invention, since the reduced pressure drop across the valve, as compared to valves of the prior art, permits the use of lower horsepower pumping apparatus to achieve a given flow rate, or an increased flow rate with a pump of given horsepower.

Another major advantage of the valve of the present invention is that it is self-adjusting for closure under varying line pressures, as opposed to valves of the prior art, which require a substantial fixed differential pressure for closure. More specifically, due to the initial full flow from the venturi through the pressure regulator 30 during the closing cycle, the valve is adapted to be closed by varing and relatively low line pressures. For example, the valves of the present invention will close under line pressures of as low as 3 p.s.i.g. or less, compared with line pressures of about 10-12 p.s.i.g. required by the valves of the prior art.

Having now described the invention, those skilled in this art will be able to make various changes and modifications without thereby departing from the spirit and scope of the invention.

What is claimed is:

1. In a flow control valve comprising a main valve connectable in a line carrying fluid under pressure and having a plunger constructed and arranged for movement to valve-closed and valve-open positions by fluid pressure, means for creating a differential fluid pressure between opposite sides of said main plunger, and first auxiliary valve means for controlling the opening and closing of said main valve by means of the fluid pressure in said line, the improvement which comprises:
   (a) a venturi,
   (b) a first line forming a flow passageway between one end of said venturi and the upstream side of said main valve,
   (c) second auxiliary valve means having an entrance port communicating with the other end of said venturi and having two additional ports therein,
   (d) a second line forming a flow passageway between one of said additional ports of said second auxiliary valve means and the downstream side of the main valve,
   (e) a third line forming a flow passageway between the center of said venturi and one surface of the plunger of the main valve,
   (f) said first auxiliary valve means having a normally open entrance port communicating with the said one end of the venturi and said first line and a pair of exit ports individually communicating with the additional ports of said second auxiliary valve means, and
   (g) means for actuating said first auxiliary valve means between a first normal position wherein the entrance port thereof is open and said two exit ports are closed, and a second position wherein said entrance port is closed and said exit ports are open.

2. The invention as recited in claim 1, wherein the said auxiliary valve is a manually-operable valve.

3. The invention as recited in claim 1, in combination with a three-way solenoid-operated valve having an entrance port and a pair of exit ports individually communicating with the corresponding ports of said auxiliary valve.

4. The invention as recited in claim 1, including a spring-biased check valve normally closing the said first line.

5. The invention as recited in claim 1, including a pressure regulator inserted in the said third line and an auxiliary flow control valve inserted in parallel with the said regulator.

6. The invention as recited in claim 1, including adjustable means settable to limit the maximum movement of said plunger away from the valve seat.

7. The invention as recited in claim 1, wherein the said first line terminates in a flared opening facing in the upstream direction and wherein the said second line terminates in a flared opening facing in the downstream direction.

8. The invention as recited in claim 1, including a plurality of guide fins carried by the plunger and extending through the said valve seat, and cooperating means carried by the plunger and the main valve to prevent rotation of the plunger relative to the valve.

References Cited

UNITED STATES PATENTS

| | | | |
|---|---|---|---|
| 862,714 | 8/1907 | Constantinov | 137—543.13 |
| 1,231,280 | 6/1917 | Metten | 251—24 X |
| 1,767,037 | 6/1930 | Anderson | 251—29 X |
| 1,804,137 | 5/1931 | Yates | 251—35 |
| 2,172,855 | 9/1939 | Siegert | 251—24 |
| 2,417,994 | 3/1947 | Sheets | 251—24 |
| 2,664,916 | 1/1954 | Conley | 251—42 X |
| 3,297,297 | 1/1967 | Hoffmann | 251—43 X |

ARNOLD ROSENTHAL, Primary Examiner

U.S. Cl. X.R.

251—30, 51